(12) United States Patent
Endo et al.

(10) Patent No.: US 7,385,742 B2
(45) Date of Patent: Jun. 10, 2008

(54) IMAGE DISPLAY APPARATUS

(75) Inventors: Takeshi Endo, Osaka (JP); Tetsuya Noda, Tenri (JP); Yasushi Tanijiri, Osakasayama (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 11/701,826

(22) Filed: Feb. 2, 2007

(65) Prior Publication Data
US 2007/0133076 A1 Jun. 14, 2007

Related U.S. Application Data

(62) Division of application No. 10/602,289, filed on Jun. 24, 2003, now Pat. No. 7,233,422.

(30) Foreign Application Priority Data
Jul. 5, 2002 (JP) ............... 2002-197518

(51) Int. Cl.
*G02B 5/32* (2006.01)
(52) U.S. Cl. .................. 359/15; 359/599; 345/32
(58) Field of Classification Search ............ None
See application file for complete search history.

(56) References Cited

U.S. PATENT DOCUMENTS

| 5,046,793 | A | 9/1991 | Hockley et al. ............ 359/12 |
| 5,418,631 | A | 5/1995 | Tedesco ............ 359/15 |
| 5,471,327 | A | 11/1995 | Tedesco et al. ............ 359/15 |
| 5,517,278 | A | 5/1996 | Takahara et al. ............ 396/374 |
| 5,929,954 | A | 7/1999 | Omae et al. ............ 349/95 |
| 5,999,281 | A | 12/1999 | Abbott et al. ............ 359/15 |
| 6,323,999 | B1 | 11/2001 | Ueda et al. ............ 359/443 |
| 6,474,809 | B2 | 11/2002 | Tanijiri et al. ............ 351/41 |
| 6,816,290 | B2 | 11/2004 | Mukawa ............ 359/15 |
| 7,019,798 | B2 * | 3/2006 | Endo et al. ............ 349/61 |
| 2002/0030773 | A1 | 3/2002 | Endo et al. ............ 349/95 |

FOREIGN PATENT DOCUMENTS

| JP | 6-18810 A | 1/1994 |
| JP | 2001-42251 A | 2/2001 |
| JP | 2002-23107 A | 1/2002 |
| WO | WO 200008519 A2 | 2/2000 |

* cited by examiner

*Primary Examiner*—Arnel C Lavarias
(74) *Attorney, Agent, or Firm*—Sidley Austin LLP

(57) ABSTRACT

An image display apparatus has: a display element for displaying an image; a light source section for supplying an illumination light to the display element; a reflection type hologram for diffracting and reflecting the illumination light so as to guide the illumination light to the display element; and an eyepiece optical system for guiding an image light from the display element to an eye of a viewer so as to provide an enlarged virtual image of the image. The reflection type hologram has diffusing properties. Since the reflection type hologram diffuses the illumination light, an incident angle of the illumination light with respect to the display element is widened to a certain extent. Since the display element does not change a propagating direction of a light ray, a propagating direction of the image light is widened similarly to widening of the incident angle, thereby enlarging the observation pupil.

4 Claims, 11 Drawing Sheets

IMAGE DISPLAY APPARATUS

This application is a divisional application of application Ser. No. 10/602,289 filed Jun. 24, 2003, now U.S. Patent No. 7,233,422, which is based on the Application No. 2002-197518 filed in Japan, Jul. 5, 2002, the entire content of which is hereby incorporated by reference.

BACKGROUND OF THE INVENTION

1. Field of the Invention

The present invention relates to an image display apparatus having a display element in which illumination light is modulated into light showing an image. Particularly, the invention relates to an illumination optical system of the image display apparatus.

2. Description of the Related Art

In recent years, a head mounting type image display apparatus which is mounted to a head and is used in front of eyes spreads as an image display apparatus for personal use. In general, the head mounting type image display apparatus has a display element for displaying an image, and an eyepiece optical system for guiding light of the image displayed on the display element to eyes of a viewer and providing an enlarged virtual image. Although CRT (Cathode-Ray Tube), for example, in which the element itself emits light showing an image is occasionally used as the display element, a liquid crystal display, in which the display element for modulating given illumination light into light showing an image (hereinafter, referred to as an image light) is combined with a small light source (for example, a light emitting diode) for supplying the illumination light, is mostly used in order to miniaturize and lighten the apparatus.

A structure, such that the light source is combined with the display element for modulating the illumination light from the light source, is provided with a diffracting reflection element for diffracting and reflecting the illumination light from the light source so as to guide it to the display element in order that while a degree of freedom of arrangement positions of the light source, the display element and the eyepiece optical system is being heightened, an incident angle of the illumination light with respect to the display element is made to be suitable.

The structure of such an image display apparatus is schematically shown in FIG. 17. The image display apparatus is composed of a liquid crystal display 91 which is the display element, a light emitting diode 92 which is the light source, a diffracting reflection element 93, an eyepiece optical system 94, and a convex lens 95. Divergence light emitted from the light emitting diode 92 as illumination light is changed into approximately parallel light by the convex lens 95. The diffracting reflection element 93 diffracts and reflects the illumination light which is changed into the approximately parallel light by the convex lens 95 at a reflection angle different from the incident angle so as to guide the light to the liquid crystal display 91. The liquid crystal display 91 guides the illumination light in the form of the approximately parallel light as an image light to the eyepiece optical system 94, and the eyepiece optical system 94 provides an enlarged virtual image of the image to an eye E of the viewer. As the diffracting reflection element 93, a diffraction grating or a hologram is used.

A prior image display apparatus for guiding the illumination light to the eyepiece optical system through the diffracting reflection element, however, has a small observation pupil because the illumination light guided to the display element is parallel light or is extremely close to the parallel light. The eye of the viewer is, therefore, easily deviated from the observation pupil of the apparatus due to a change in a relative position between the apparatus and the eye of the viewer, and a part of an image to be observed is omitted or the image cannot be observed completely. The head mounting type image display apparatus desirably provides easy mounting and has agreeability, and it is mostly of a glass type. In this form, however, the apparatus easily moves, thereby a situation where the image cannot be observed arises frequently.

Even if a member for fitting is devised so as not to move the apparatus, since a gap between left and right eyes differs depending on individuals and the relative position between the apparatus and the eye differs depending on viewers, it is difficult to provide the image display apparatus with high general-purpose properties. In order to provide the apparatus with which many people easily observe an image, it is necessary that the entire optical system including the light source through the eyepiece optical system is movable with respect to a mounting member, and thus the structure becomes complicated, and the miniaturization and lightening become difficult.

SUMMARY OF THE INVENTION

In order to solve the above problems, it is an object of the present invention to provide an image display apparatus having a large observation pupil. Another object of the present invention is to provide an image display apparatus having a large observation pupil in which illumination light can be utilized efficiently for observation of an image.

In order to achieve the above objects, according to the present invention, in an image display apparatus comprising: a light source section for supplying an illumination light; a display element for modulating a given illumination light into an image light showing an image; a reflection type hologram for diffracting and reflecting the illumination light from the light source section so as to guide the illumination light to the display element; and an eyepiece optical system for guiding the image light from the display element to an eye of a viewer so as to provide an enlarged virtual image of the image. The reflection type hologram has diffusing properties, and while diffracting and reflecting the illumination light, diffuses the illumination light so as to guide the diffused light to the display element.

Since the reflection type hologram not only diffracts and reflects the illumination light so as to change its propagating direction but also diffuses the illumination light, an incident angle of the illumination light with respect to the display element is widened to a certain extent. Since the display element modulates the illumination light but does not change a propagating direction of a light (if a transmission display element, the incident angle is equal with an emergence angle, and if a reflection type display element, the incident angle is equal with a reflecting angle), a propagating direction of the image light is widened similarly to widening of the incident angle, thereby enlarging the observation pupil.

In order to achieve the above objects, according to another invention, an image display apparatus comprising: a light source section for supplying the illumination light; a display element for modulating a given illumination light into an image light showing an image; a first reflection type hologram for diffracting and reflecting the illumination light from the light source section so as to guide the illumination light to the display element, the first reflection type hologram having diffusing properties; a second reflection type hologram for guiding an image light from the display element to an eye of a viewer so as to provide an enlarged virtual image of the image; and a transparent plate-shaped prism for holding the second reflection type hologram. The image display apparatus is used with the second reflection type hologram placed in front of the eye of viewer and with the transparent plate-shaped prism facing the eyes. The image light from the display element enters the transparent plate-shaped prism at an end surface thereof so as to be guided to the second reflection type hologram and is guided to the eye of the viewer by the second reflection type hologram as an enlarged virtual image of the image, and a light from an outer world transmits through the plate-shaped prism and the second reflection type hologram so as to be guided to the eye, thereby the viewer can simultaneously see an image of the outer world and the virtual image. And the viewer can see the virtual image with a large observation pupil because of diffusing properties of the first reflection type hologram.

BRIEF DESCRIPTION OF THE DRAWINGS

These and other objects, advantages and features of the invention will become apparent from the following description thereof taken in conjunction with the preferred embodiments with the reference to the accompanying drawings in which.

DETAILED DESCRIPTION OF THE PREFERRED EMBODIMENTS

Figure 1:
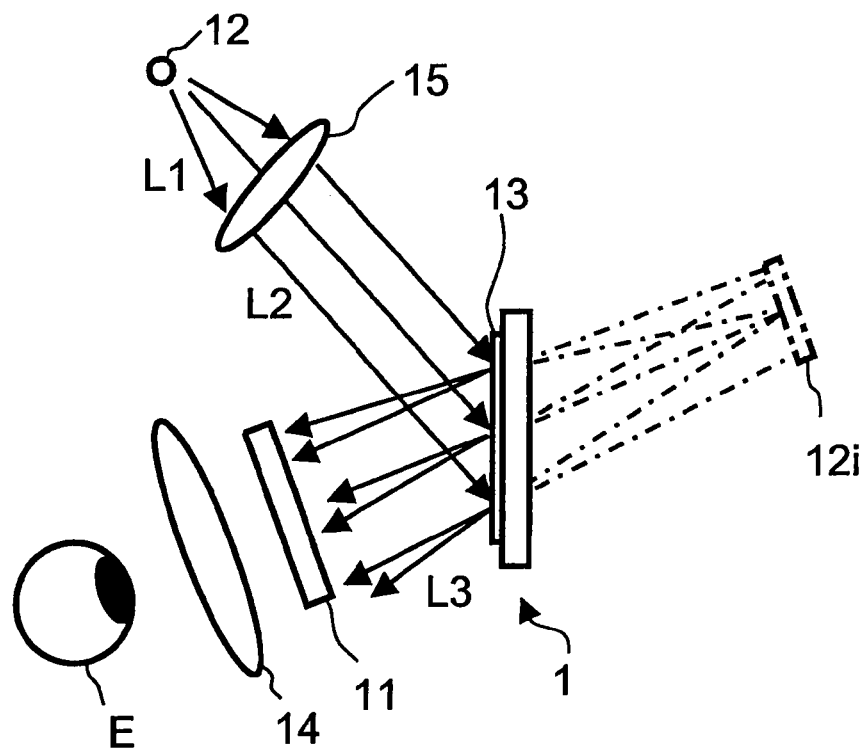
FIG. 1 is a diagram schematically showing an optical structure of an image display apparatus according to a first embodiment.

Embodiments of an image display apparatus of the present invention will be explained below with reference to the drawings. An optical structure of the image display apparatus 1 according to a first embodiment is schematically shown in FIG. 1. The image display apparatus 1 has a liquid crystal display 11, a light emitting diode (LED) 12, a reflection type hologram 13, an eyepiece optical system 14 and a convex lens 15.

The liquid crystal display 11 has a plurality of pixels and is applied a voltage to the pixels so as to be capable of changing a state of a liquid crystal layer. When an electric signal based on image data is input into the liquid crystal display 11, the liquid crystal display 11 modulates given illumination light into an image light. The LED 12 supplies the illumination light to be given to the liquid crystal display 11. The reflection type hologram 13 diffracts and reflects the illumination light given from the LED 12 via the convex lens 15 and guides 1st-order diffracted reflection light to the liquid crystal display 11. The eyepiece optical system 14 guides the image light from the liquid crystal display 11 to an eye E of a viewer, and provides an enlarged virtual image of the image on the liquid crystal display 11. The convex lens 15 changes divergent light L1 from the LED 12 into approximately parallel light L2 so as to give it to the reflection type hologram 13.

The reflection type hologram 13 has diffusing properties, and diffracts and reflects the illumination light L2 from the convex lens 15 and simultaneously diffuses it. An incident angle of illumination light L3 with respect to the liquid crystal display 11, therefore, has a distribution. The liquid crystal display 11 does not influence a traveling direction of the light, and the image light comes out of the pixels of the liquid crystal display 11 at an outgoing angle which is the same as the incident angle so as to reach the eyepiece optical system 14. The observation pupil of the image display apparatus 1 is, therefore, large, and even if a relative position between the image display apparatus 1 and the eye E of the viewer fluctuates, the eye E of the viewer is difficultly deviated from the observation pupil.

In order to provide a bright image, the convex lens 15 and the eyepiece optical system 14 are set so that the LED 12 and the eye E of the viewer are optically conjugated. The LED 12 is small and is close to a point light source. Since the size of the observation pupil is approximately proportional to an area of the light source, when the reflection type hologram 13 simply diffracts and reflects the illumination light L2 from the convex lens 15, the observation pupil is small. When the diffusing properties are, however, provided to the reflection type hologram 13, the apparatus is in a state such that a large surface light source 12$i$ is provided in order to illuminate the liquid crystal display 11, thereby realizing the large observation pupil.

Figure 2:
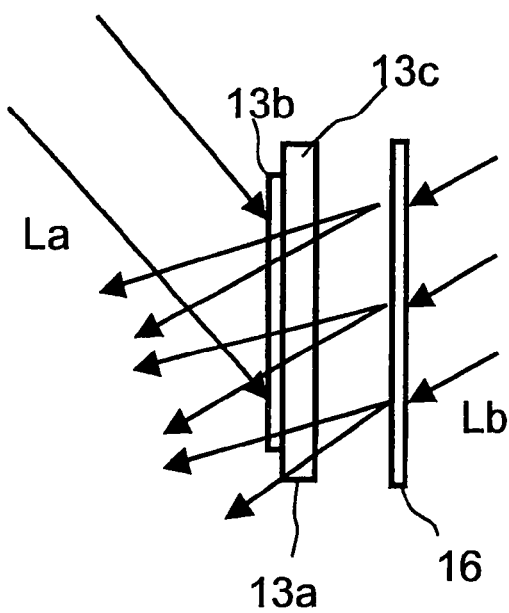
FIG. 2 is a diagram schematically showing a method of manufacturing a reflection type hologram provided to the image display apparatus according to the first embodiment.

A method of manufacturing the reflection type hologram 13 having the diffusing properties is schematically shown in FIG. 2. A photosensitive material 13$b$ is applied or is bonded to a transparent substrate 13$c$ made of glass, acrylic or the like, so that a primary body 13$a$ of the hologram 13 is obtained. A transmission diffusing plate 16 is arranged on the primary body 13$a$ on the side of the substrate 13$c$, and two laser beams La, Lb, which are obtained by branching a laser beam emitted from the same laser beam source, are emitted from the side of the photosensitive material 13$b$ and the side of the diffusing plate 16, respectively, and interference bands of the laser beams La, Lb are recorded on the photosensitive material 13$b$. The laser beam La is approximately parallel light similarly to the illumination light L2 from the convex lens 15, and is emitted from the same direction as the illumination light L2. The laser beam Lb is also approximately parallel light, and is emitted from a direction where the diffracted and reflected illumination light L3 is extended to an upper stream side.

The laser beam Lb transmits through the diffusing plate 16 so as to be diffused, the interference bands of the laser beam La and the diffusing laser beam Lb are recorded on the photosensitive material 13$b$, so that the reflection type hologram 13 having diffusing properties similar to the diffusing plate 16 can be obtained. A type of the photosensitive material 13$b$ is not particularly limited, and general materials such as silver salt, dichromic acid gelatin and photopolymer can be used. Particularly the photopolymer can be subject to a post-treatment after the recording of the interference bands according to a dry process, and thus it is preferable from a viewpoint of treatment efficiency.

As the transmission diffusing plate 16, a plate in which a surface of a transparent substrate is roughed, or a plate in which a diffusing resin is mixed with an optically transparent material which is conventionally known can be used. In the latter one, however, since reflected light is increased and transmitted light is reduced topically, the former one is preferable.

It is also considered that the transmission diffusing plate is arranged on an optical path including the LED 12 through the liquid crystal display 11, and the illumination light is diffused not by the reflection type hologram 13 but by the transmission diffusing plate so that the observation pupil is enlarged. On the diffusing plate in which the surface of transparent substrate is roughed, however, uneven intensity of the transmitted light easily occurs due to the convexo-concave shape, and when the diffusing plate is arranged in a vicinity of the liquid crystal display, uneven brightness occurs on the light showing the image, thereby deteriorating quality of the image to be provided. On the transmission diffusing plate in which the diffusing resin is mixed, light is mostly lost by reflection, thereby greatly deteriorating use efficiency of the light from the LED 12.

When the hologram is provided with the diffusing function, the plate in which the surface of the transparent substrate is roughed is used as the transmission diffusing plate 16 at the time of the manufacturing, and as shown in FIG. 2, the transmission diffusing plate 16 and the photosensitive material 13$b$ are not bonded but separated, thereby recording a state such that the uneven intensity due to the uneven surface of the transmission diffusing plate 16 is mitigated on the photosensitive material 13$b$. That is to say, the reflection type hologram 13 is characterized in that it is equivalent to the transmission diffusing plate 16 from a viewpoint of a diffusing angle, but it has higher uniformity than the transmission diffusing plate 16 from a viewpoint of the intensity of the diffused light to be provided. In the image display apparatus 1 in which the illumination light is diffused by the reflection type hologram 13, therefore, the image with higher quality and less uneven brightness can be provided in comparison with the case where the illumination light is diffused by the prior transmission diffusing plate in which the surface of the transparent substrate is roughed.

In order to provide a color image, red light (hereinafter, referred to as R light), green light (hereinafter, referred to as G light) and blue light (hereinafter, referred to as B light) may be guided as the illumination light to the liquid crystal display 11. In this case, three photosensitive materials which selectively have sensitivity with respect to the R light, G light and B light are laminated on the substrate, and laser beams of the R light, the G light and the B light are emitted individually, so that the interference bands are formed on the photosensitive materials. As a result, the high diffracting reflection efficiency can be obtained. In another method, a single photosensitive material having the sensitivity with respective to the R light through the B light is used, so that the laser beams of three colors may be emitted. As a result, a cost can be suppressed. Two photosensitive materials can be used, or holograms which are manufactured individually can be laminated. At the time of use, three kinds of the LEDs 12 for emitting the R light, the G light and the B light are used.

Figure 3A:
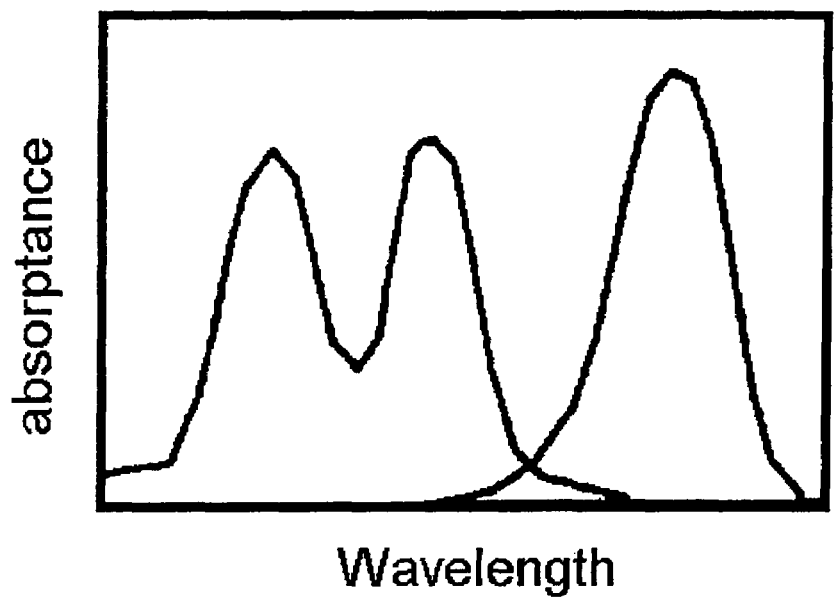
FIG. 3A shows an example of a relationship between a wavelength of laser beam for exposure and absorptance of photosensitive materials in the case where two kinds of hologram photosensitive materials are used.
Figure 3B:
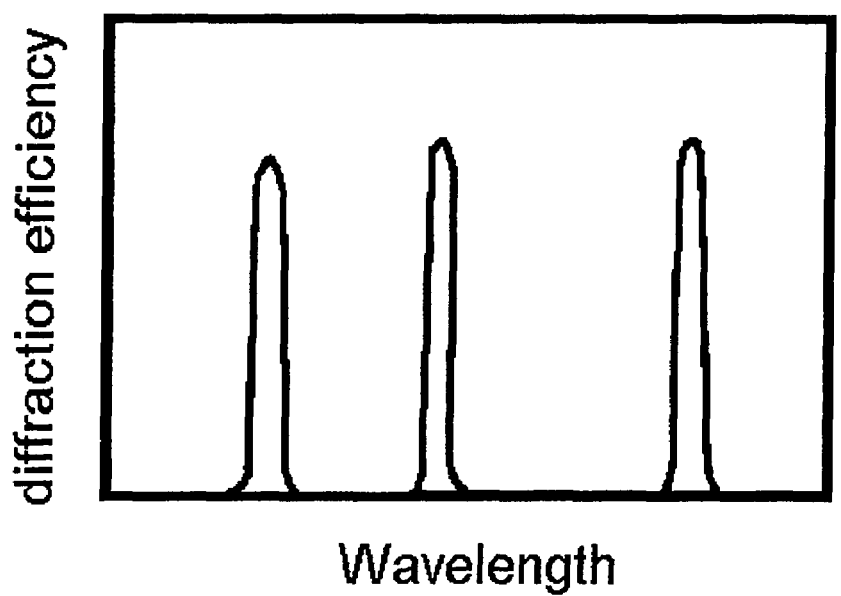
FIG. 3B is a diagram schematically showing a relationship between a wavelength and diffracting reflection efficiency in the obtained reflection type hologram.

As the three-color laser beams, the laser beams having wavelengths closer to wavelengths of the three-color illumination light at the time of use are used. FIG. 3A shows a relationship between the wavelength of the laser beam and absorptance of the respective photosensitive materials when the photosensitive material having the sensitivity to the R light, and the photosensitive material having the sensitivity to the G light and the B light are used so as to manufacture the reflection type hologram 13. FIG. 3B shows a relationship between the wavelength in the obtained reflection type hologram 13 and the diffracting reflection efficiency. As a result, the reflection type hologram 13 has peaks of the diffracting reflection efficiency with respect to the R light, G light and the B light emitted from the three kinds of the LEDs 12, so that the image display apparatus 1 which is capable of providing a bright image with excellent color balance can be obtained.

The three LEDs 12 for supplying the three-color illumination light may be arranged in a sheet of FIG. 1, or may be arranged in a vertical direction with respect to the sheet. In both the cases, the laser beam La on the side of the photosensitive material 13$b$ is emitted from the same direction as the illumination light from the LEDs 12 in order to avoid lowering of the diffracting reflection efficiency at the time of use. When this condition is considered, the three LEDs 12 is desirably arranged in a plane vertical to a line for connecting a center of the liquid crystal display 11 and a center of the reflection type hologram 13 so as to be equally separated from the line. This because the directions of the laser beams La, Lb are made to be uniform, and the primary body 13a is only turned so that the above condition is satisfied, thereby facilitating the manufacturing and simplifying a structure of a hologram exposing device.

In the image display apparatus 1 of the embodiment, the transmission type liquid crystal display is used as the display element, but the reflection type liquid crystal display can be used. Another type of the display element having a different modulating principle can be used. As the light source, besides the LED, an electroluminescence element (hereinafter, referred to as an EL element) can be used. The reflection type hologram 13 having the diffusing properties is provided so that the large observation pupil can be realized even if the light source is small. Importance is, therefore, attached to the properties of the element such as light emitting intensity and a life, and the light source may be selected.

Although the eyepiece optical system 14 is composed of a single convex lens, it may be composed of a plurality of lenses, a reflection surface, a prism having axially asymmetric curved surfaces, a reflection type hologram, a transmission type hologram, a diffraction optical element (hereinafter, referred to as DOE) or the like. In order to realize miniaturization and lightening so as to cope with the large observation pupil, however, it is desirable that the eyepiece optical system 14 includes the hologram or the DOE. These points are applied similarly to following embodiments.

Figure 4:
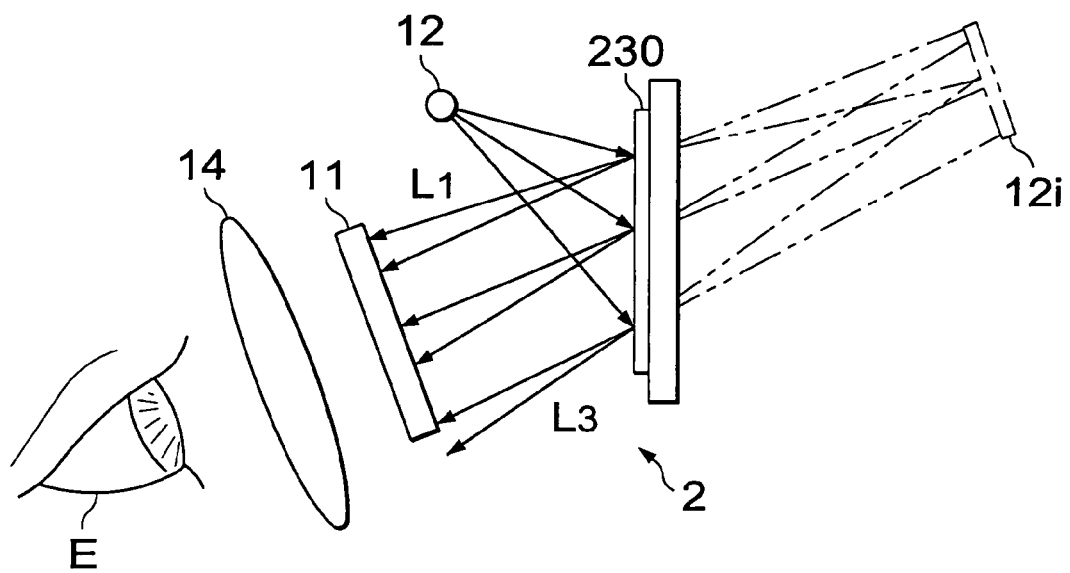
FIG. 4 is a diagram schematically showing the optical structure of the image display apparatus according to a second embodiment.

FIG. 4 schematically shows the optical structure of the image display apparatus 2 according to a second embodiment. In the image display apparatus 2 modified by the image display apparatus 1, a positive optical power is provided to the reflection type hologram 230 so that the convex lens 15 is omitted. The reflection type hologram 230 still has the diffusing properties, and the image display apparatus 2 has the large observation pupil similarly to the case where the liquid crystal display 11 is illuminated by a large surface light source 12i.

The optical power of the reflection type hologram 230 is set so that, if it does not have the diffusing properties, the divergent light L1 from the LED 12 is changed into the approximately parallel light, in other words, the diffracted and reflected illumination light L3 whose diffusing angle is 0° is changed into the approximately parallel light. As a result, the illumination light L3, which is guided from the reflection type hologram 230 to the liquid crystal display 11, becomes equivalent to that in the image display apparatus 1.

Figure 5:
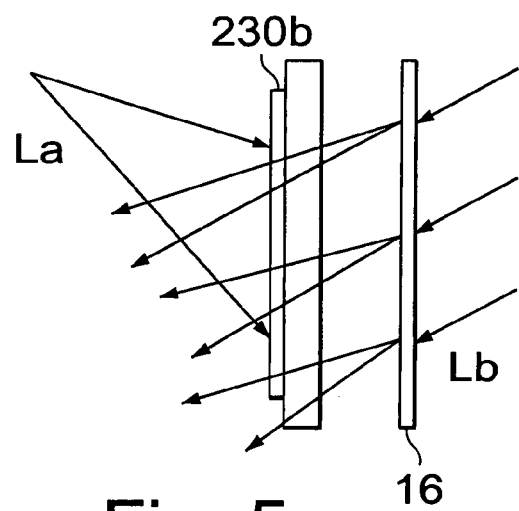
FIG. 5 is a diagram schematically showing the method of manufacturing the reflection type hologram provided to the image display apparatus according to the second embodiment.

The method of manufacturing the reflection type hologram 230 is schematically shown in FIG. 5. A difference from the manufacturing method of the first embodiment (FIG. 2) is only a point that the laser beam La emitted from the side of the photosensitive material 230b is changed into the divergent light. In order to change the laser beam La into the divergent light, the laser beam from the laser beam source is a parallel light with small diameter and it is allowed to pass through a pinhole, or is transmitted through the convex lens or a concave lens. The pinhole and the lenses are arranged on the position where the LED 12 is arranged at the time of use.

In the embodiment, the light source section supplies the divergent light as the illumination light, and the reflection type hologram has the positive optical power, and the diffracted and reflected illumination light whose diffusing angle is 0° is the approximately parallel light. When the illumination light whose diffusing angle is 0° is the approximately parallel light, while the illumination light is being diffused, most part of the illumination light can be guided to the display element, so that the illumination light from the light source can be utilized efficiently for providing an image. A small element such as the light emitting diode can be used as the element for emitting the illumination light, and it is not necessary to additionally provide an optical element for changing the illumination light as the divergent light into the approximately parallel light, thereby facilitating the miniaturization and the lightening.

Figure 6:
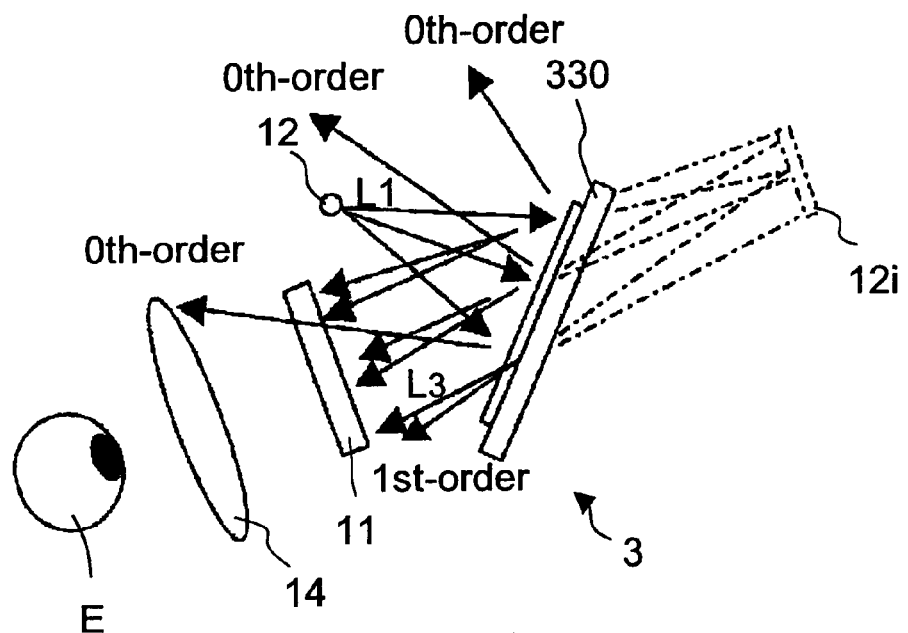
FIG. 6 is a diagram schematically showing the optical structure of the image display apparatus according to a third embodiment.

The optical structure of the image display apparatus 3 according to a third embodiment is schematically shown in FIG. 6. In the image display apparatus 3 modified by the image display apparatus 2 according to the second embodiment, 1st-order diffracted reflection light and 0th-order diffracted reflection light of the reflection type hologram 330 having positive optical power are separated securely from each other, and the liquid crystal display 11 is arranged in a vicinity of a position where the 1st-order diffracted reflection light and the 0th-order diffracted reflection light are separated.

The illumination light L1 from the LED 12 is the divergent light, and the 0th-order diffracted reflection light does not receive the optical power of the reflection type hologram 330 so as to be still the divergent light. The 1st-order diffracted reflection light and the 0th-order diffracted reflection light are not, therefore, separated immediately unlike the first embodiment in which the approximately parallel light L2 is guided by the convex lens 15 to the reflection type hologram 13. When the 0th-order diffracted reflection light as well as the 1st-order diffracted reflection light enters the liquid crystal display 11, the image light has the uneven intensity, and in the case of providing the color image, color shading also occurs.

In the image display apparatus 3 of the embodiment, in order to avoid deterioration of the quality of the image due to the 0th-order diffracted reflection light, the reflection type hologram 330 is set so that the 1st-order diffracted reflection light and the 0th-order diffracted reflection light are separated as immediately as possible. It is desirable from a viewpoint of the quality of the image that the liquid crystal display 11 is arranged farther from the reflection type hologram 330 than the position where the 1st-order diffracted reflection light and the 0th-order diffracted reflection light are separated. In order to avoid the enlargement of the apparatus, however, the liquid crystal display 11 is arranged in a vicinity of the separating position.

In order to separate the 0th-order diffracted reflection light from the 1st-order diffracted reflection light immediately, the LED 12 and the reflection type hologram 330 are set so that one angle on the side of the liquid crystal display 11 out of two angles formed by a principal ray of the divergent light L1 from the LED 12 and the reflection type hologram 330 (they are supplementary angles) becomes an acute angle. As a result, not less than half of the 0th-order diffracted reflection light advances to a direction separated from the liquid crystal display 11, and even the ray which is the closest to the liquid crystal display 11 is separated from the 1st-order diffracted reflection light in a position closer to the reflection type hologram 330.

Such a structure can reduce the 0th-order diffracted reflection light which enters the liquid crystal display 11 to be slight, or can eradicate it, thereby preventing the deterioration of the quality of the image due to the mixing of the 0th-order diffracted light.

The method of manufacturing the reflection type hologram 330 is the same as that in the second embodiment (FIG. 5). The pinhole and the lens which change the laser beam La on the side of the photosensitive material into the divergent light are arranged on the position provided with the LED 12 at the time of use, and an optical path with small diameter of the laser beam for guiding the light to the pinhole and the lens are made to coincide with the optical path of the principal ray of the LED 12.

Figure 7:
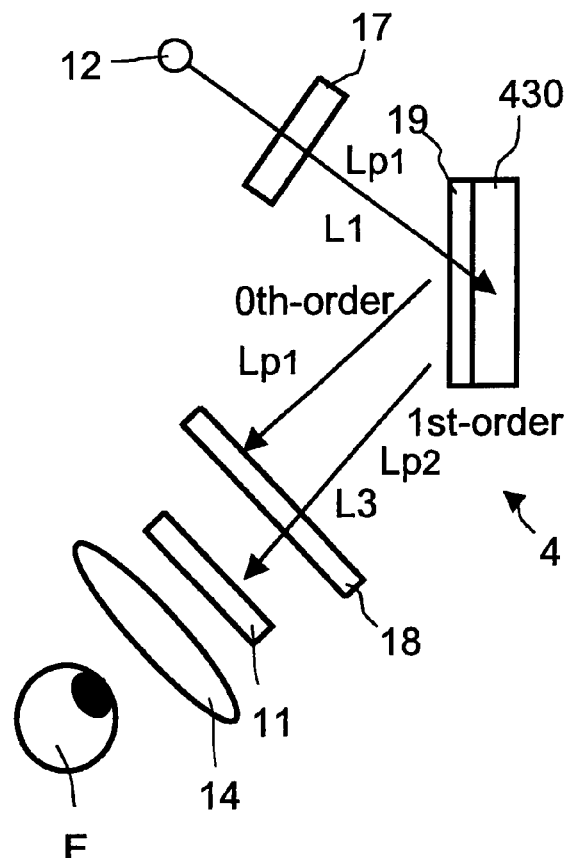
FIG. 7 is a diagram schematically showing the optical structure of the image display apparatus according to a fourth embodiment.

The optical structure of the image display apparatus 4 according to a fourth embodiment is schematically shown in FIG. 7. The image display apparatus 4 defined by the image display apparatus 2 according to the second embodiment is structured so that the 1st-order diffracted reflection light and the 0th-order diffracted reflection light (reflected light from the surface of the hologram 13) of the reflection type hologram 430 having a positive optical power have different polarizing properties, and only the 1st-order diffracted reflection light is guided to the liquid crystal display 11 by utilizing a difference between the polarizing properties. Concretely, the illumination light L1 from the LED 12 is first linearly polarized light Lp1, and the 1st-order diffracted reflection light of the illumination light L3 from the reflection type hologram 430 is second linearly polarized light Lp2 whose polarizing direction crosses perpendicularly to the polarizing direction of the first linearly polarized light Lp1. The surface reflected light is still the linearly polarized light Lp1.

A first polarizing element 17 is arranged between the LED 12 and the reflection type hologram 430, and a second polarizing element 18 is arranged between the reflection hologram 430 and the liquid crystal display 11. A ¼ wavelength plate 19 is bonded to the surface of the reflection type hologram 430. On the first polarizing element 17 the illumination light L1 as a nonpolarized light from the LED 12 is only the first linearly polarized light Lp1, and a second polarizing element 18 shields the first linearly polarized light Lp1 so as to transmit only the second linearly polarized light Lp2. Since refraction indexes of the reflection type hologram 430 and the ¼ wavelength plate 19 are barely different, reflected light (0th-order diffracted reflection light) is barely generated on the surface of the hologram 430. A polarizing direction of the surface reflected light of the ¼ wavelength plate 19 does not change, and the 1st-order diffracted reflection light transmits through the ¼ wavelength plate 19 twice so that the polarizing direction is turned by 90°. As a result, only the 1st-order diffracted reflection light is guided to the liquid crystal display 11.

As the first polarizing element 17, an absorption polarizing filter, a reflection polarizing filter, a polarizing beam splitter or the like can be used, but particularly the reflection polarizing filter is preferable. This is because the first linearly polarized light Lp1 which returns to the LED 12 can be reutilized, and the use efficiency of the light is heightened. As the second polarizing element 18, an absorption polarizing plate, a reflection polarizing plate and the like can be used. A polarizing plate (not shown) on the incident side provided on the liquid crystal display 11 can be commonly used as the second polarizing element 18.

The reflection type holograms 13, 230, 330, 430 of the image display apparatuses 1 through 4 according to the embodiments can have the isotropic diffusing properties in which diffusibility (diffusing angle) is uniform in all directions or can have the anisotropic diffusing properties in which the diffusibility differs according to directions. The diffusing properties of the reflection type holograms 13, 230, 330, 430 are determined by diffusing properties of the diffusing plate 16 (FIGS. 2 and 5) which is used for the manufacturing, and a direction and a degree of the diffusing anisotropy of the reflection type holograms 13, 230, 330, 430 can be adjusted depending on the setting of the properties and the arrangement direction of the diffusing plate 16.

Figure 8A:
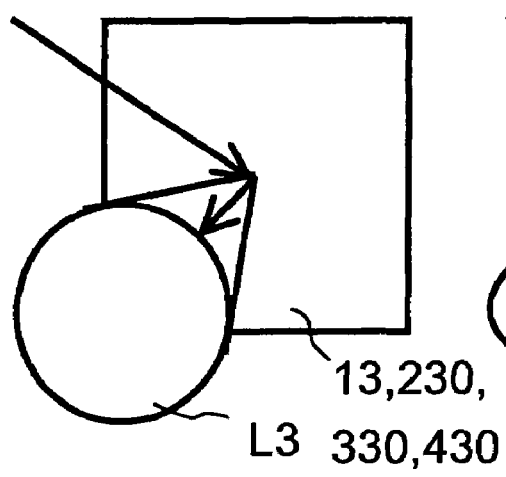
FIG. 8A is a diagram showing a sectional shape of illumination light in the case where the reflection type hologram provided to the image display device according to the embodiments has isotropic diffusing properties.
Figure 8B:
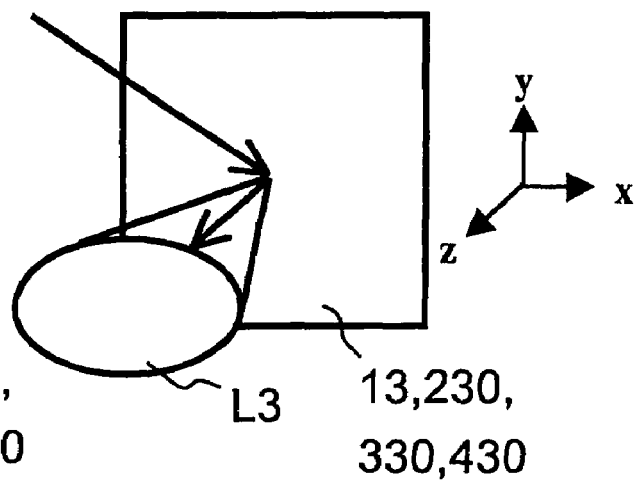
FIG. 8B is a diagram showing an example of the sectional shape of the illumination light in the case where the reflection type hologram has anisotropic diffusing properties.

FIG. 8A shows a sectional shape of the illumination light L3 which is guided to the liquid crystal display 11 in the case where the reflection type holograms 13, 230, 330, 430 have the isotropic diffusing properties. FIG. 8B shows an example of the sectional shape of the illumination light L3 in the case where the reflection type holograms 13, 230, 330, 430 have the anisotropic diffusing properties. In the example of FIG. 8B, the diffusing angle of the horizontal direction (direction x) of the viewer is set to be larger than the diffusing angle in the vertical direction (direction y).

Figure 9A:
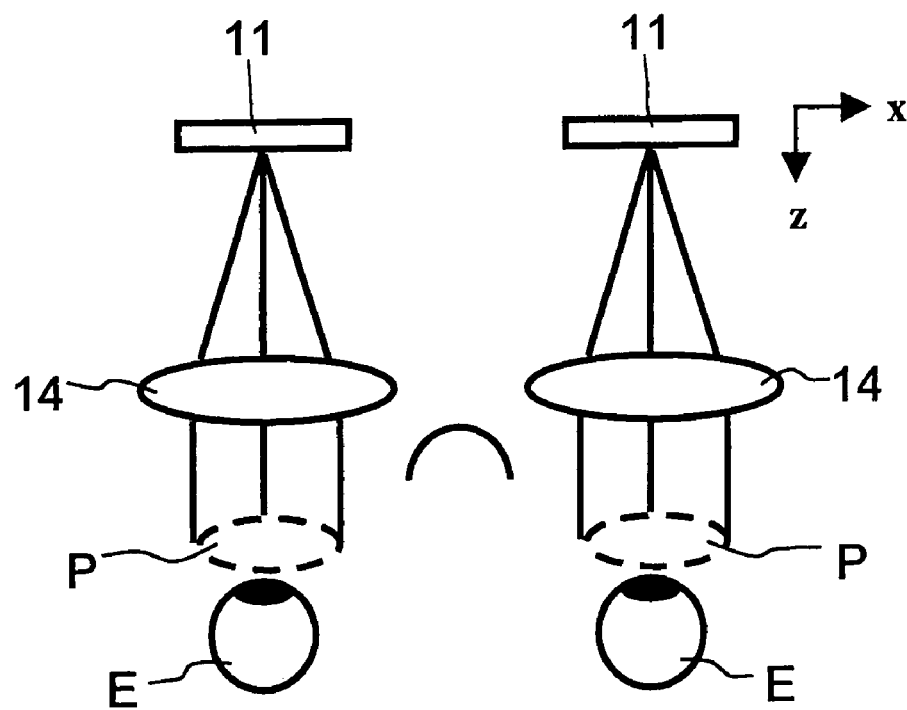
FIGS. 9A and 9B are diagrams showing a size of an observation pupil when the reflection type hologram has the diffusing properties of FIG. 8B and a position relationship between the observation pupils and eyes of a viewer.
Figure 9B:
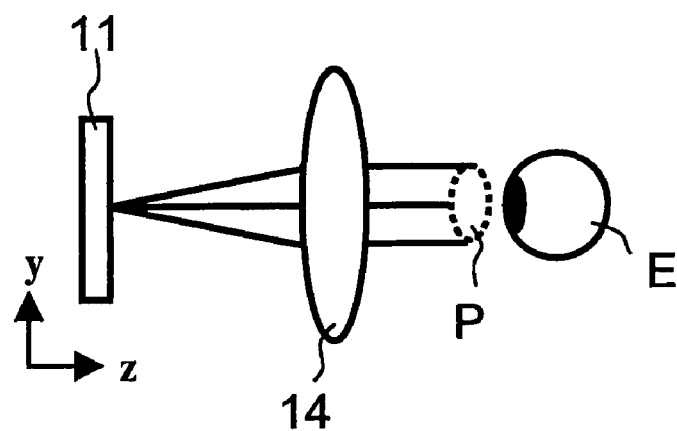

FIG. 9 shows a size of the observation pupil P and a position relationship between the observation pupil P and the eye E of the viewer when the image display apparatus in which the diffusing properties of the reflection type holograms 13, 230, 330, 430 are set as shown in FIG. 8B are used on both the right and left eyes. As shown in FIG. 9A, the observation pupil P is large in the horizontal direction, and even if the gap between the two apparatuses is uniform, the observation of an image is easy for many viewers whose gaps of the right and left eyes E are different. As shown in FIG. 9B, the observation pupil P is small in the vertical direction, and light which advances to a direction where a possibility that the eye E is positioned is weak is removed, so that the light can be utilized efficiently for the observation of the image. The observation pupil P is larger in the vertical direction than the case where the reflection type holograms 13, 230, 330, 430 do not have the diffusing properties, and even if the relative position between the apparatus and the eye E slightly fluctuates at the time of use, omission does not occur on the image to be observed.

A diffracting angle (diffusing properties) of the reflection type holograms 13, 230, 330, 430 may be enlarged in a direction of a nodal line between a plane and the reflection type holograms 13, 230, 330, 430. The plane includes the center of the liquid crystal display 11, the light emitting diode 12 (an emitting point) and the center of the reflection type holograms 13, 230, 330, 430. As a result, even if a slight error is generated in the alignment of the reflection type holograms 13, 230, 330, 430 with respect to the liquid crystal display 11 and the alignment of the light emitting diode 12 with respect to the reflection type holograms 13, 230, 330, 430, the eye of the viewer falls within the observer pupil, thereby lowering the accuracy necessary for assembly and thus improving the manufacturing efficiency.

When the reflection type holograms 13, 230, 330, 430 are manufactured, instead of that the diffusing plate 16 is arranged close to the primary bodies 13a, 230a, 330a, 430a as shown in FIGS. 2 and 5, an image 16' of the diffusing plate 16 is formed by the convex lens 20 or the like as shown in FIGS. 10A-D, and the laser beam after the imaging and the laser beam before the imaging may be used as one laser beam Lb. As a result, the reflection type holograms 13, 230, 330, 430 reproduce the image 16' of the diffusing plate 16.

Figure 10A:
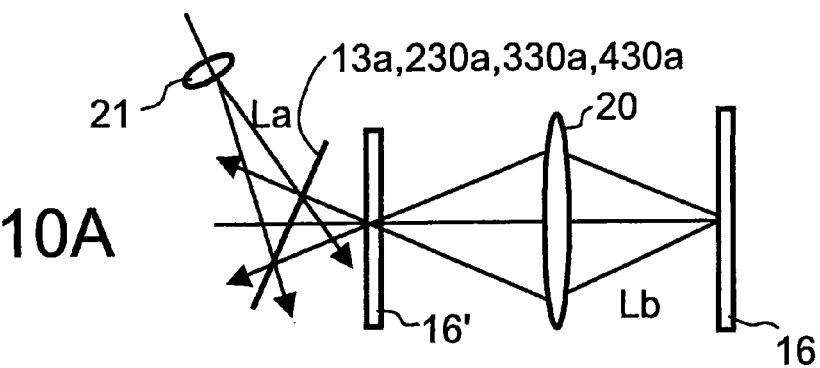
FIGS. 10A through 10D are diagrams schematically showing other methods of manufacturing the reflection type hologram provided to the image display apparatus according to the embodiments.

As shown in FIG. 10A, when the image 16' of the diffusing plate 16 is formed between the diffusing plate 16 and the primary bodies 13a, 230a, 330a, 430a, light which is equivalent to the light arrived from the diffusing plate positioned farther than the reflection type hologram 13 is obtained at the time of use. The lens 21 for changing the laser beam La into the divergent light is, as explained above, arranged in the position provided with the LED 12 at the time of use. In FIG. 10A and FIGS. 10B through 10D described below, when the reflection type hologram 13 is manufactured, a lens for generating a parallel light may be used suitably.

Figure 10B:
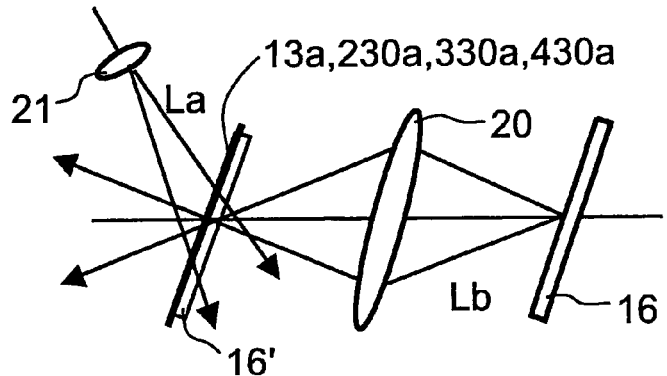
Figure 10C:
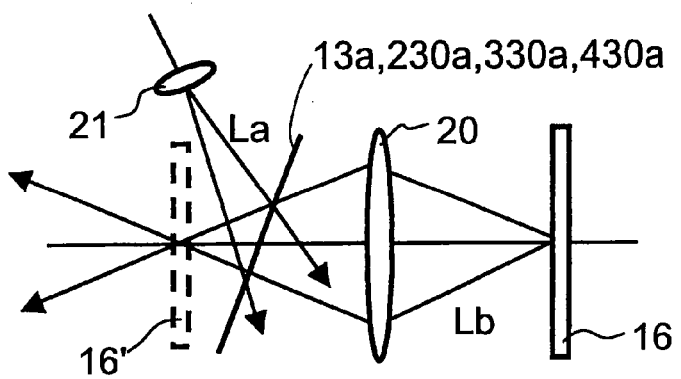

As shown in FIG. 10B, when the image 16' of the diffusing plate 16 is formed on the primary bodies 13a, 230a, 330a, 430a, the light which is equivalent to the light arrived from the diffusing plate positioned on the reflection type holograms 13, 230, 330, 430 is obtained. As shown in FIG. 10C, when the image 16' of the diffusing plate 16 is tried to be formed after transmitting through the primary bodies 13a, 230a, 330a, 430a, the light which is equivalent to the light arrived from the diffusing plate positioned between the reflection type holograms 13, 230, 330, 430 and the liquid crystal display 11.

Figure 10D:
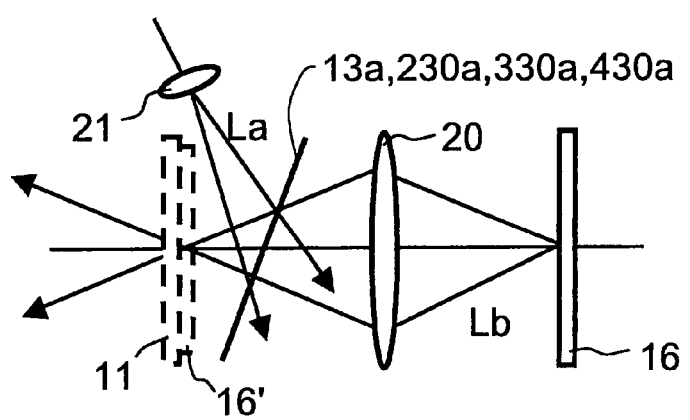

As shown in FIG. 10D, when the image 16' of the diffusing plate 16 is formed in the position provided with the liquid crystal display 11 at the time of use, the light which passes through a vicinity of the liquid crystal display 11 is eliminated, thereby improving the light utilizing efficiency.

In the method shown in FIGS. 10A, 10C, 10D, since the image 16' of the diffusing plate 16 is spatially separated from the primary bodies 13a, 230a, 330a, 430a, the state such that the uneven intensity of the transmitted light on the diffusing plate 16 is slackened is recorded on the primary bodies 13a, 230a, 330a, 430a, and the reflection type holograms 13, 230, 330, 430 for reproducing the state are obtained. As mentioned above, therefore, the high-quality image without less uneven brightness can be provided in comparison with the case where the illumination light is diffused by the transmission diffusing plate which is obtained by roughing the surface of the transparent substrate.

Figure 11:
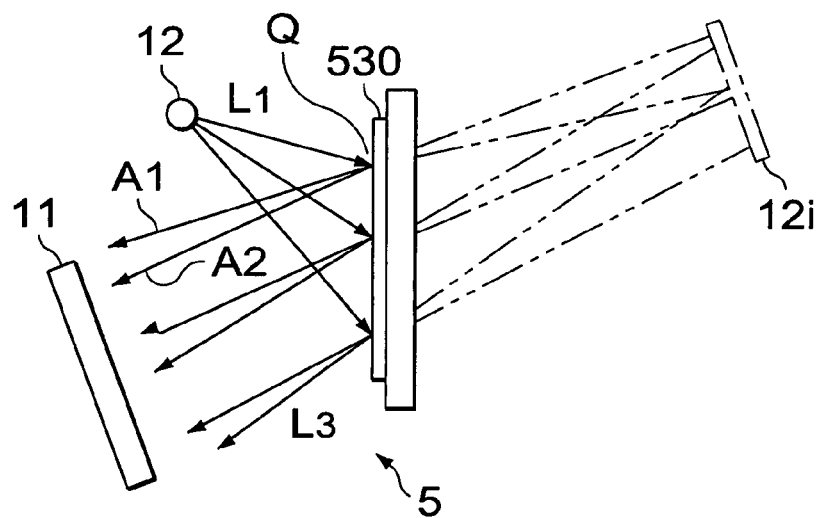
FIG. 11 is a diagram schematically showing a part of the optical structure of the image display apparatus according to a fifth embodiment.

A part of the optical system of the image display apparatus 5 according to a fifth embodiment will be schematically shown in FIG. 11. The image display apparatus 5 has the liquid crystal display 11, the LED 12 and the reflection type hologram 530. The divergent light L1 from the LED 12 is guided directly to the reflection type hologram 530. The reflection type hologram 530 has the diffusing properties similarly to the above-mentioned embodiments, but diffracts and reflects the illumination light which enters the same point Q on the reflection type hologram 530, at angles different according to wavelengths. When a wavelength of a light beam A1 in the drawing, for example, is designated by $\lambda 1$, and a wavelength of a light beam A2 is designated by $\lambda 2$, $\lambda 1 \neq \lambda 2$.

Figure 12:
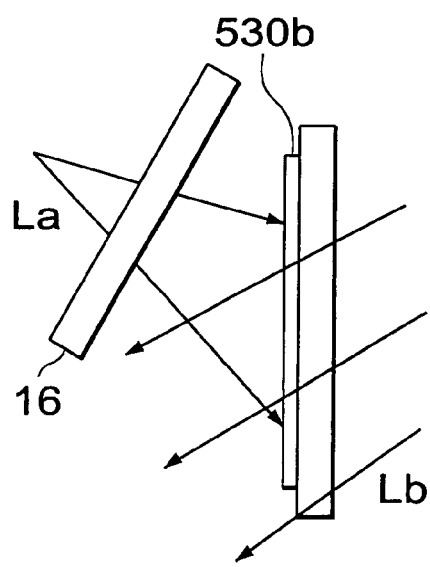
FIG. 12 is a diagram schematically showing a method of manufacturing the reflection type hologram provided to the image display apparatus according to a fifth embodiment.

The method of manufacturing the reflection type hologram 530 is schematically shown in FIG. 12. The laser beam La emitted from the photosensitive material 530b is supposed to be the divergent light. Differently from the above-mentioned embodiments, the diffusing plate 16 is arranged on the optical path of the laser beam La as the divergent light. As a result, the reflection type hologram 530 which makes the diffracting reflection angle different according to the wavelengths can be obtained.

Figure 13:
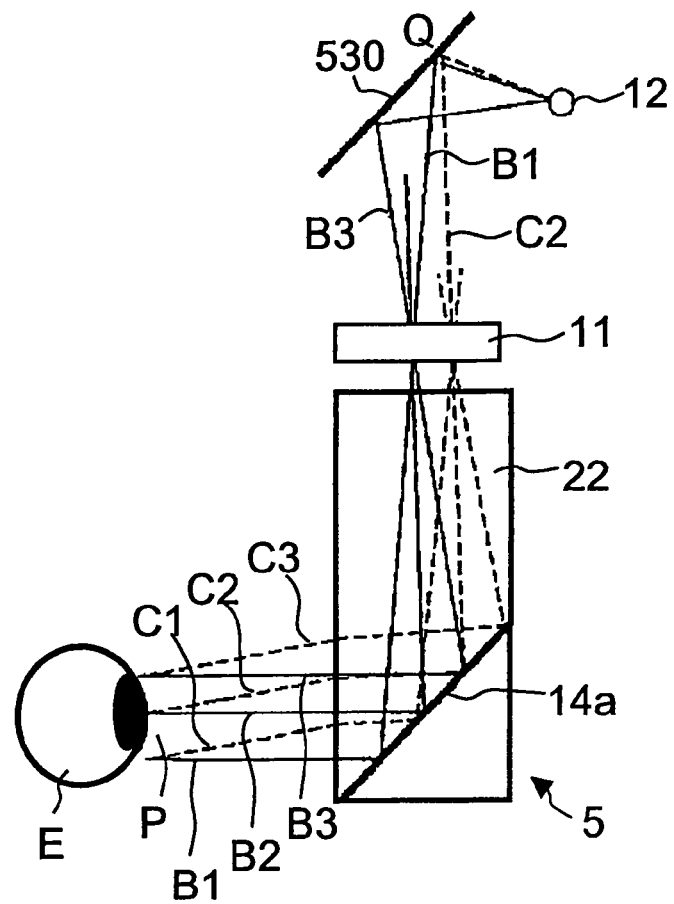
FIG. 13 is a diagram schematically showing the entire optical structure of the image display apparatus according to the fifth embodiment.

The entire optical structure of the image display apparatus 5 is schematically shown in FIG. 13. In the image display apparatus 5, the reflection type hologram 14a is used as the eyepiece optical system 14. In order to avoid confusion between the reflection type hologram 14a and the reflection type hologram 530 for guiding the illumination light, the reflection type hologram 14a is called as an eyepiece hologram. The eyepiece hologram 14a is provided in a flat plate type prism 22, and reflect the image light which enters the prism 22 from its end surface to guide the light to the eye E of the viewer, so as to provide the enlarged virtual image of the image.

Figure 14:
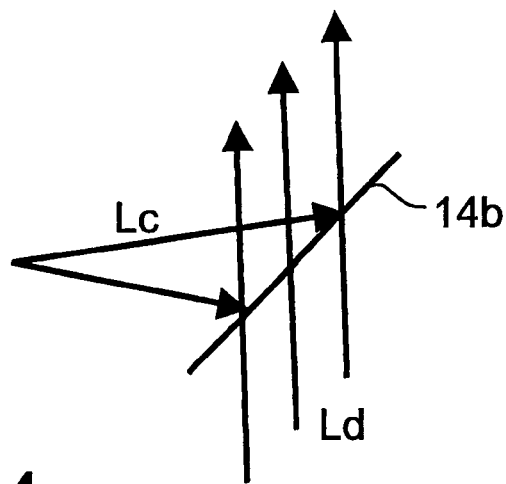
FIG. 14 is a diagram schematically showing a method of manufacturing the reflection type hologram as an eyepiece optical system provided to the image display apparatus according to the fifth embodiment.

The method of manufacturing the eyepiece hologram 14a is schematically shown in FIG. 14. The laser beam Ld as the parallel light and the laser beam Lc as the divergent light are emitted to the photosensitive material 14b, so that the interference bands of them are recorded. The laser beam Lc is emitted from a position corresponding to the eye of the viewer (observation pupil), and the laser beam Ld is emitted from a direction which is the same as or opposite to the direction of the image light. This provides the eyepiece hologram 14a having a function for providing the enlarged virtual image.

In the eyepiece hologram 14a manufactured in such a manner, however, a difference is made on a peak wavelength of the diffracting reflection efficiency depending on the incident angles. The three light beams B1, B2, B3 shown in FIG. 13, for example, enter the eyepiece hologram 14a at different incident angles, and the peak wavelengths of their diffracting reflection efficiency are also different. When the size of the observation pupil P is supposed to be 3 mm, a distance from the observation pupil P to the center of the eyepiece hologram 14a to be 20 mm, a thickness of the eyepiece hologram 14a to be 20 μm, refractive index percentage modulation to be 0.01, a center wavelength of the illumination to be 532 nm, and an angle of view of the image to be provided (up-down direction in FIG. 13) to be 10°, the difference in the peak wavelength of the diffracting reflection efficiency between the light beams B1 and B3 reaches 40 nm. This is similarly applied to light beams C1 and C3.

On the other hand, the light beams B1 and C1 in which the incident angles with respect to the eyepiece hologram 14a are equal have no difference in the peak wavelength of the diffracting reflection efficiency. This is similarly applied to the light beams B2 and C2 and the light beams B3 and C3.

In order to enlarge the observation pupil P while using the eyepiece hologram 14a having such properties, it is necessary that the illumination light has a certain wavelength width, and the light beams which enter the eyepiece hologram 14a at different angles have wavelength distribution according to the diffracting reflection efficiency. The reflection type hologram 530 which guides the illumination light to the liquid crystal display 11 is, therefore, provided with the properties which make a difference in the wavelength of the light advancing to different directions. The reflection type hologram 530 can increase a light quantity in a wavelength at which the diffracting reflection efficiency on the eyepiece hologram 14a becomes low, thereby offsetting the above properties of the eyepiece hologram 14a.

The light from the LED 12 which enters one point Q of the reflection type hologram 530 is diffracted and reflected to different directions according to wavelengths, and for example, it is divided into the light beam B1 and the light beam C2. The light beams B1 and C2 pass through the liquid crystal display 11 and the eyepiece hologram 14a so as to form some parts of the observation pupil P. The light which enters another point of the reflection type hologram 530 and divided similarly forms some part of the observation pupil P. Quantities of these light are sufficient, and thus the large observation pupil P can be obtained entirely.

Figure 15:
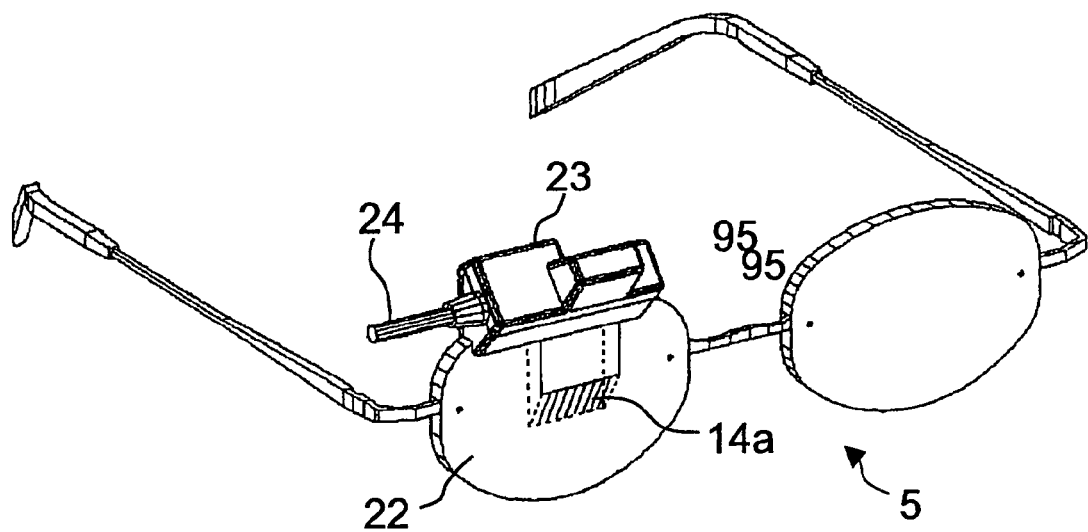
FIG. 15 is a perspective view showing an outline when the image display apparatus according to the fifth embodiment is of a glass type.

An outline of the glass-type image display apparatus 5 is shown in FIG. 15. A frame 23 which houses the liquid crystal display 11, the light emitting diode 12 and the reflection type hologram 530 is attached to an upper edge of the prism 22 corresponding to the lens of the glasses. The eyepiece hologram 14a is provided on a center portion of the prism 22. The frame 23 is connected with a cable 24 for giving an image signal, a control signal and the like from a controller, not shown.

Figure 16:
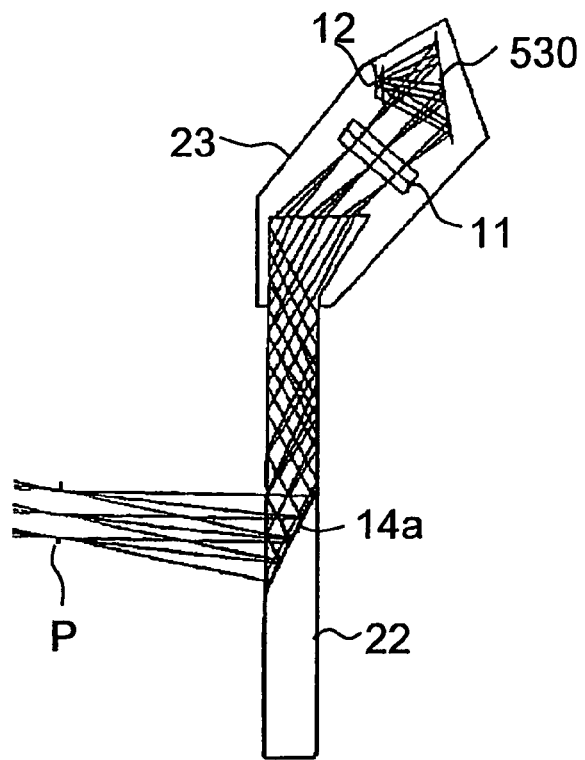
FIG. 16 is a sectional view of the image display apparatus according to the fifth embodiment.
Figure 17:
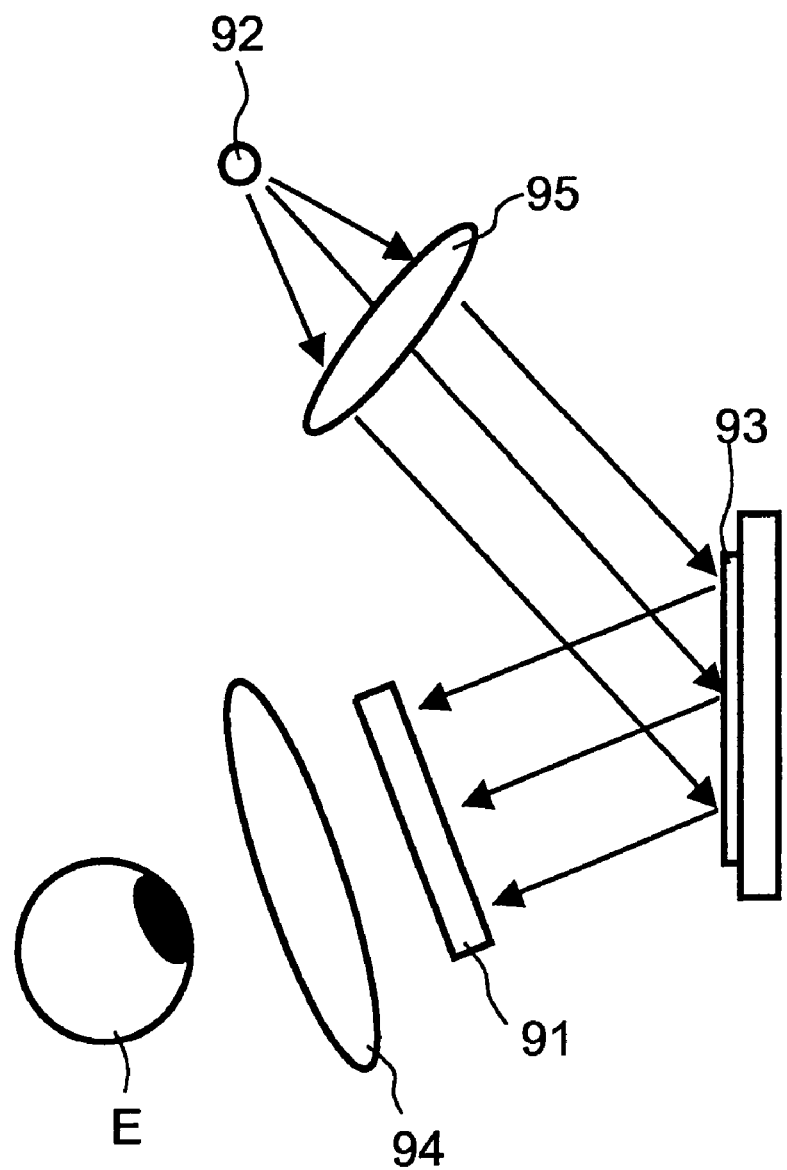
FIG. 17 is a diagram schematically showing the optical structure of a prior image display apparatus.

The cross section of the image display apparatus 5 is shown in FIG. 16. The upper end of the prism 22 has a wedge-shaped section, and the light emitting diode 12, the reflection type hologram 530 and the liquid crystal display 11 are arranged in the frame 23 so that the image light from the liquid crystal display 11 enters the end surface of the prism 22 slantingly. The light from the liquid crystal display 11, which goes into the prism 22 from its end surface, is totally reflected from the two surfaces of the prism 22 and simultaneously advances downward, so as to be guided to the eye by the eyepiece hologram 14a.

The prism 22 is transparent, and the viewer mounted with the image display apparatus 5 can observe an outer world via the prism 22. Also the eyepiece hologram 14a transmits light from the outer world, and provides the enlarged virtual image of the image which is overlapped with the image of the outer world.

That the diffusing properties are provided to the reflection type hologram for guiding the illumination light to the display element can be applied also to a projector for enlarging an image and projecting the enlarged image on a screen. In general, in order to widen the angle range in which the image can be observed, the screen is provided with the diffusing properties, but the reflection type hologram for guiding the illumination light is also provided with the diffusing properties, thereby further widening the angle range in which the image on the screen can be observed. In order to enable an image of the outer world behind the screen also to be observed, even when the screen is a transparent plate without the diffusing property, the angle range in which the image can be observed can be widened by changing the illumination light into the diffused light. Instead of the eyepiece optical system 14, only a projecting optical system for imaging the light showing the image from the liquid crystal display 11 on the screen is provided, so that such a projector can be obtained.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image display apparatus comprising:
   a light source section for supplying an illumination light;
   a display element for modulating a given illumination light into an image light showing an image;
   a first reflection type hologram for diffracting and reflecting the illumination light from the light source section so as to guide the illumination light to the display element, the first reflection type hologram having diffusing properties;
   a second reflection type hologram for guiding an image light from the display element to an eye of a viewer so as to provide an enlarged virtual image of the image; and
   a transparent plate-shaped prism for holding the second reflection type hologram,
   wherein the image display apparatus is used with the second reflection type hologram placed in front of the eye of viewer and with the transparent plate-shaped prism facing the eyes,
   the image light from the display element enters the transparent plate-shaped prism at an end surface thereof so as to be guided to the second reflection type hologram and is guided to the eye of the viewer by the second reflection type hologram as an enlarged virtual image of the image, and
   a light from an outer world transmits through the plate-shaped prism and the second reflection type hologram so as to be guided to the eye, thereby the viewer can simultaneously see an image of the outer world and the virtual image.

2. The image display apparatus as claimed in claim 1, the light source section supplying the illumination light with a plurality of wavelengths, wherein a light component of the illumination light which enters the reflection type hologram at a same point are diffracted and reflected by the reflection type hologram at different angles according to a wavelength of the light component.

3. The image display apparatus as claimed in claim 2, wherein a peak wavelength of diffraction efficiency of the first reflection type hologram differs from that of the second reflection type hologram.

4. The image display apparatus as claimed in claim 1, wherein the image display apparatus is a glass-type image display apparatus.

* * * * *